United States Patent
Oh et al.

(10) Patent No.: US 12,472,790 B2
(45) Date of Patent: Nov. 18, 2025

(54) VEHICLE STRUT INSULATOR

(71) Applicants: HYUNDAI MOTOR COMPANY, Seoul (KR); KIA CORPORATION, Seoul (KR)

(72) Inventors: Sung Jae Oh, Seoul (KR); Sang Hoon Yoo, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 571 days.

(21) Appl. No.: 17/868,440

(22) Filed: Jul. 19, 2022

(65) Prior Publication Data
US 2023/0056209 A1 Feb. 23, 2023

(30) Foreign Application Priority Data
Aug. 18, 2021 (KR) .................. 10-2021-0108985

(51) Int. Cl.
*B60G 15/06* (2006.01)
*B60G 13/00* (2006.01)

(52) U.S. Cl.
CPC ......... *B60G 15/067* (2013.01); *B60G 13/003* (2013.01); *B60G 15/062* (2013.01); *B60G 2204/128* (2013.01)

(58) Field of Classification Search
CPC .. B60G 15/062; B60G 15/067; B60G 15/068; B60G 13/003; B60G 2202/02; B60G 2202/12; B60G 2202/31; B60G 2204/41; B60G 2204/128; B60G 2206/73; B60G 2600/44

USPC ......................................................... 188/378
See application file for complete search history.

(56) References Cited

U.S. PATENT DOCUMENTS

| 2008/0048370 | A1* | 2/2008 | Corlet | B60G 15/068 267/220 |
| 2008/0303196 | A1* | 12/2008 | Lyew | B62D 17/00 267/33 |
| 2012/0049428 | A1* | 3/2012 | Moore | F16F 13/14 267/220 |
| 2012/0261868 | A1* | 10/2012 | Kim | B60G 15/068 267/195 |
| 2017/0158012 | A1* | 6/2017 | Hubert | F16C 33/761 |
| 2017/0274719 | A1* | 9/2017 | Broeckx | F16F 1/12 |

FOREIGN PATENT DOCUMENTS

KR 20090062956 A 6/2009

* cited by examiner

*Primary Examiner* — Robert A. Siconolfi
*Assistant Examiner* — San M Aung
(74) *Attorney, Agent, or Firm* — Lempia Summerfield Katz LLC

(57) ABSTRACT

Disclosed is a vehicle strut insulator that includes first and second bushes (100 and 200) having different hardness characteristics. The first bush (100) having a relatively high hardness is disposed in a left-right direction of a vehicle that affects the handling performance, and the second bush (200) having a relatively low hardness is disposed in a forward-backward direction of the vehicle that affects the ride comfort. Accordingly, the vehicle strut insulator can satisfy both requirements for handling performance, ride comfort and road noise performance.

9 Claims, 5 Drawing Sheets

VEHICLE STRUT INSULATOR

CROSS-REFERENCE TO THE RELATED APPLICATION

This application claims priority to and the benefits of Korean Patent Application No. 10-2021-0108985, filed on Aug. 18, 2021, the entire contents of which is incorporated herein by reference.

BACKGROUND

1. Field

The present disclosure relates to a vehicle strut insulator, and more particularly, to a vehicle strut insulator capable of satisfying both requirements for handling performance and for ride comfort and road noise (NVH; Noise, Vibration, and Harshness) performance.

2. Description of the Related Art

In general, a suspension of a vehicle is a device that connects an axle to a body of the vehicle and prevents direct transmission of vibration or shock from the road surface to the body while the vehicle is driving, thereby preventing damage to the body or cargo therein and providing better ride comfort.

For a front-wheel MacPherson strut suspension, a strut insulator is installed between the top of a strut and a vehicle body.

Such a strut insulator serves to isolate a small load transmitted through a strut (damper) during normal driving and to isolate a large load transmitted from a spring during cornering and impact, among the loads transmitted through wheels and tires.

A conventional strut insulator has a disadvantage in that it cannot satisfy both handling performance of a vehicle, as well as ride comfort and road noise performance thereof, because the insulator is made of only one rubber having a specific hardness in taking charge of vibration isolation and shock absorption.

In other words, the higher the hardness of the rubber, the better the handling performance, but the worse the ride comfort and the road noise performance. On the other hand, the lower the hardness of the rubber, the better the ride comfort and the road noise performance, but the worse the handling performance. Hence, the conventional strut insulator made of a single kind of rubber having a specific hardness has a disadvantage in that it cannot satisfy both requirements for handling performance and for ride comfort and road noise performance, as described above.

The foregoing is intended merely to aid in understanding of the background of the present disclosure, and is not intended to mean that the present disclosure falls within the purview of the related art that is already known to those skilled in the art.

SUMMARY

The present disclosure provides an improved vehicle strut insulator that includes two bushes, which have different hardnesses and are oriented in different directions, in order to satisfy both requirements for handling performance and for ride comfort and road noise performance.

In one embodiment of the present disclosure, a vehicle strut insulator includes: a first bush and a second bush having different hardnesses, an insert plate coupled to the first and second bushes, and an upper cup and a lower cup coupled to the first and second bushes through centers thereof.

The first bush may be made of hard rubber having a relatively high hardness compared to the second bush, and the second bush may be made of soft rubber having a relatively low hardness compared to the first bush.

The first bush may be made of rubber with low dynamic characteristics for desirable vibration isolation, and the second bush may be made of rubber with high damping force for desirable shock absorption.

The first bush with low dynamic characteristics may have a larger total area than the second bush with high-damping characteristics.

The first bush may be disposed in a left-right direction of a vehicle that affects handling performance, and the second bush may be disposed in a forward-backward direction of the vehicle that affects ride comfort.

The first bush may have upper and lower portions spaced apart from the respective upper and lower cups to attenuate a small load transmitted through a strut.

The second bush may have grooves formed in respective upper and lower portions thereof, and the upper and lower portions of the second bush may be in contact with the upper and lower cups through the grooves, respectively, to attenuate a large load transmitted through a coil spring.

Tapered boundaries may be formed in the first and second bushes and be spaced apart from each other to prevent interference during deformation under an axial load.

The first bush may have a central portion formed to overlap the upper and lower cups, thereby preventing the first bush from sliding relative to the upper and lower cups when a load is applied thereto.

The second bush may have a central portion formed to overlap the upper and lower cups, thereby preventing the second bush from sliding relative to the upper and lower cups when a load is applied thereto.

BRIEF DESCRIPTION OF THE DRAWINGS

The above and other objects, features and other advantages of the present disclosure should be more clearly understood from the following detailed description taken in conjunction with the accompanying drawings, in which.

Figure 1:
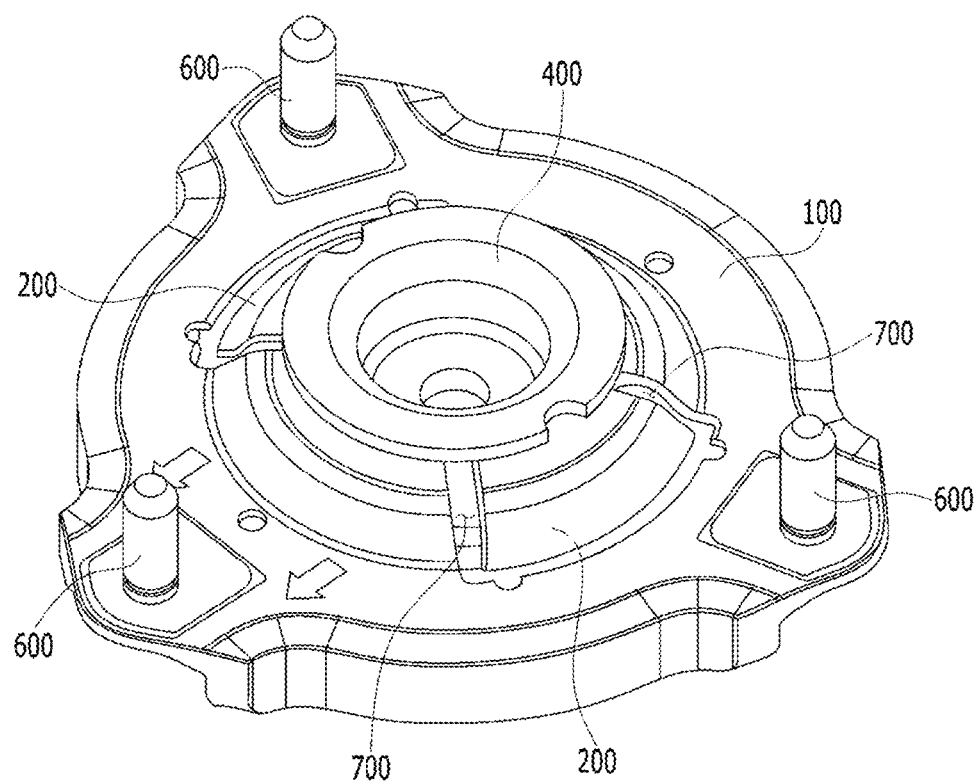
FIG. 1 is a perspective view illustrating a vehicle strut insulator according to an embodiment of the present disclosure.
Figure 2:
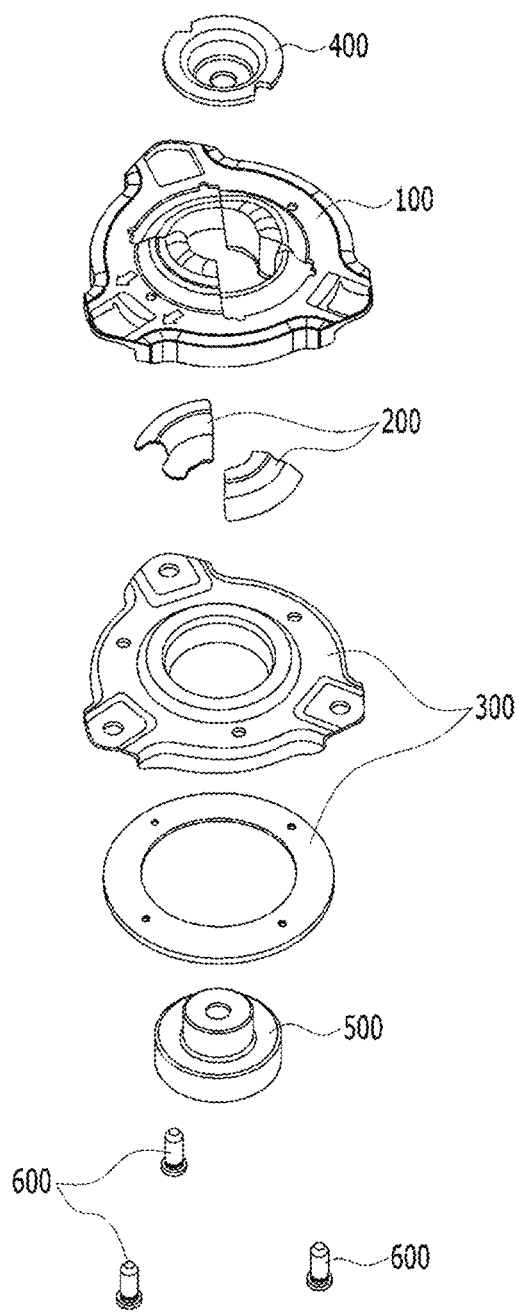
FIG. 2 is an exploded view of FIG. 1.

The drawings described herein are for illustration purposes only and are not intended to limit the scope of the present disclosure in any way.

DETAILED DESCRIPTION

The specific structural and functional descriptions disclosed in the specification or application are merely illustrated for the purpose of describing embodiments of the present disclosure. The present disclosure may be embodied in different forms, and should not be construed as being limited to the embodiments set forth herein.

The present disclosure may be subjected to various modifications and may have various forms, and specific embodiments are illustrated in the drawings and described in detail herein. However, this is not intended to limit the present disclosure to a specific embodiment. It should be understood that the present disclosure includes all modifications, equivalents or replacements that fall within the spirit and technical scope thereof.

Terms such as "first" and/or "second" may be used herein to describe various elements of the present disclosure, but these elements should not be construed as being limited by the terms. In other words, such terms are used only for the purpose of differentiating one element from other elements of the present disclosure. For example, without departing from the scope and spirit of the present disclosure, a first element may be referred to as a second element, and, similarly, a second element may also be referred to as a first element.

It should be understood that when an element is referred to as being "coupled" or "connected" to another element, it can be directly coupled or connected to the other element, or intervening elements may also be present. On the other hand, it should be understood that when an element is referred to as being "directly coupled" or "directly connected" to another element, no intervening elements are present. Other expressions for describing relationships between elements, for example, "between" and "immediately between" or "neighboring" and "directly neighboring", may also be interpreted likewise.

The terminology used herein is for the purpose of describing particular embodiments only, and is not intended to limit the present disclosure. As used herein, the singular forms "a", "an" and "the" are intended to include the plural forms as well, unless the context clearly indicates otherwise. It should be further understood that the terms "comprises/includes" and/or "comprising/including", when used in the specification, specify the presence of stated features, integers, steps, operations, elements, components, and/or groups thereof, but do not preclude the presence or addition of one or more other features, integers, steps, operations, elements, components, and/or groups thereof.

When a component, device, element, or the like of the present disclosure is described as having a purpose or performing an operation, function, or the like, the component, device, or element should be considered herein as being "configured to" meet that purpose or to perform that operation or function.

Unless otherwise defined, all terms used herein, including technical and scientific terms, have the same meanings as those commonly understood by one of ordinary skill in the art. It should be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

The control unit (controller) according to the exemplary embodiment of the present disclosure may be implemented through a processor (not shown) configured to perform the operation described below using an algorithm configured to control the operation of various components of the vehicle or a nonvolatile memory (not shown) configured to store data relating to software instructions for reproducing the algorithm and data stored in that memory. Here, the memory and the processor may be implemented as separate chips. Alternatively, the memory and the processor may be integrated with each other and implemented as a single chip. The processor may take the form of one or more processors.

Hereinafter, a vehicle strut insulator according to an exemplary embodiment of the present disclosure is described with reference to the accompanying drawings.

As illustrated in FIGS. 1 to 5, the vehicle strut insulator according to the embodiment of the present disclosure includes a first bush 100 and a second bush 200 having different hardness characteristics, an insert plate 300 coupled to the first and second bushes 100 and 200, an upper cup 400 and a lower cup 500 coupled to the first and second bushes 100 and 200 through the centers thereof, and a plurality of bolts 600.

The first and second bushes 100 and 200 are each made of a rubber material that functions to isolate vibration and attenuate shock applied thereto.

The insert plate 300 is made of a steel material and is coupled to the first and second bushes 100 and 200 in a vulcanized form. The insert plate 300 serves to reinforce the first and second bushes 100 and 200 made of rubber.

In the state in which the insert plate 300 is coupled to the first and second bushes 100 and 200, the upper cup 400 is press-fitted into the first and second bushes 100 and 200 by passing through the centers thereof from above, and the lower cup 500 is press-fitted into the first and second bushes 100 and 200 by passing through the centers thereof from below. The upper cup 400 and the lower cup 500 are coupled to each other by projection welding.

The bolts 600 are then press-fitted into the insert plate 300.

In the present disclosure, the first bush 100 is made of hard rubber having a relatively high hardness compared to the second bush 200, and the second bush 200 is made of soft rubber having a relatively low hardness compared to the first bush 100.

In addition, the first bush 100 is made of rubber with low dynamic characteristics for desirable vibration isolation, and the second bush 200 is made of rubber with high damping force for desirable shock absorption.

Figure 3:
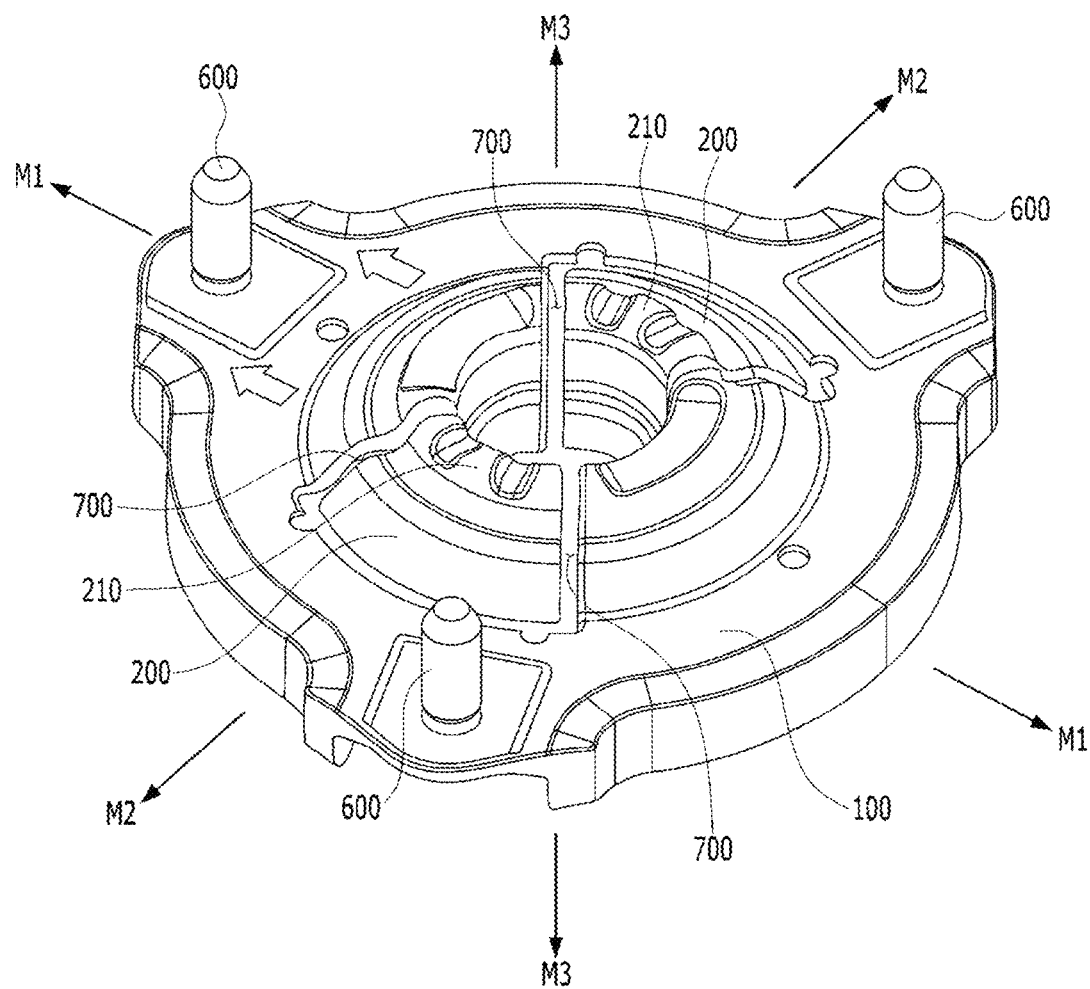
FIG. 3 is a view in which upper and lower cups are removed from FIG. 1.

In one embodiment, when the strut insulator is installed to a vehicle, the first bush 100, having a relatively high hardness compared to the second bush 200, is disposed in a left-right direction of the vehicle (in a direction of arrow M1 in FIG. 3). The first bush 100 affects handling performance. The second bush 200 having a relatively low hardness compared to the first bush 100 is disposed in a forward-backward direction of the vehicle (in a direction of arrow M2 in FIG. 3) and affects ride comfort.

In FIG. 3, the direction of arrow M1 is the left-right direction (lateral direction) that affects the handling performance of the vehicle, the direction of arrow M2 is the forward-backward direction that affects the ride comfort of the vehicle, and the direction of arrow M3 is an upward-downward direction that affects the road noise (NVH) and ride comfort of the vehicle.

In order for the vehicle to quickly steer in response to the operation of a steering wheel by a driver while the vehicle is cornering, the lateral static characteristics of the bush are increased. To this end, in an embodiment of the present disclosure, the first bush 100 having a relatively high hardness is disposed in the left-right direction of the vehicle that affects the handling performance.

In order to reduce the impact applied to the vehicle when the vehicle passes over a bump or the like, the forward-backward static characteristics of the bush are decreased. Moreover, a high-damping bush is applied in the forward-backward direction to resolve aftershock after an occurrence of impact. To this end, in an embodiment of the present disclosure, the second bush 200 having a relatively low hardness is disposed in the forward-backward direction of the vehicle that affects the ride comfort thereof.

In addition, in order to suppress a vehicle rolling when the vehicle turns or changes lanes, the vertically static characteristics of the bush are increased. Furthermore, in order to maximally isolate vibration transmitted from the road surface to the body of the vehicle, a low-dynamic-magnification bush is applied, thereby improving ride comfort and NVH performance in the upward-downward direction.

In the field of rubber insulators, this is defined as dynamic magnification=dynamic characteristics/static characteristics.

"Static characteristics" refers to characteristics in a static state (at a frequency of 0 Hz), whereas "dynamic characteristics" refers to characteristics at frequency excitation. Accordingly, the lower the dynamic magnification, the better the NVH, and the static and dynamic characteristics are in a directly proportional relationship.

Typically, the static and dynamic characteristics of rubber have a directly proportional relationship. Such a bush with low proportional magnification is called a "low-dynamic-magnification bush".

Rubber dissipates its load while being displaced relative to an input load thereto when it is subjected to a load. A bush made of rubber with such a large dissipation rate of load is called a "high-damping bush".

With regard to static characteristics, high static characteristics should be realized in the left-right direction and low static characteristics should be realized in the forward-backward direction. To this end, the second bush 200, which is a low-dynamic-magnification bush having a relatively high hardness, is disposed in the left-right direction of the vehicle that affects the handling performance thereof, and the second bush 200, which is a high-damping bush having a relatively low hardness, is disposed in the forward-backward direction of the vehicle that affects the ride comfort thereof.

According to one embodiment of the present disclosure, a first bush 100 with low dynamic characteristics has a larger total area than the second bush 200 with high-damping characteristics. This imparts the strut insulator with greater overall strength and rigidity.

The present disclosure provides a structure in which the first bush 100 has upper and lower portions spaced apart from the respective upper and lower cups 400 and 500 to attenuate a small load (damper load) transmitted through a strut.

Figure 4:
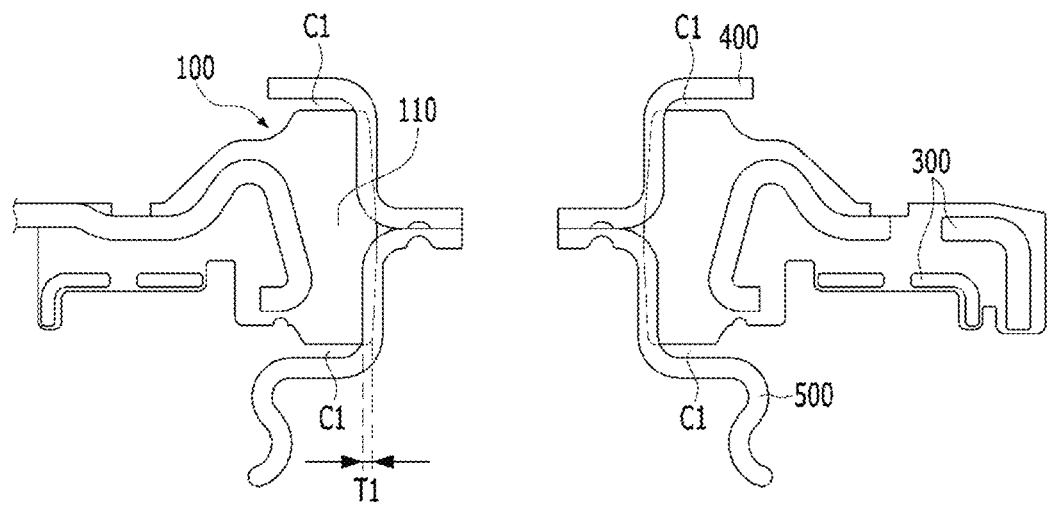
FIG. 4 is a cross-sectional view taken along direction M1 of FIG. 3.

Reference numeral C1 in FIG. 4 denotes gaps between the first bush 100 and the upper and lower cups 400 and 500. The upper and lower portions of the first bush 100 are coupled to the upper and lower cups 400 and 500 with the gaps C1 formed therebetween, respectively.

Figure 5:
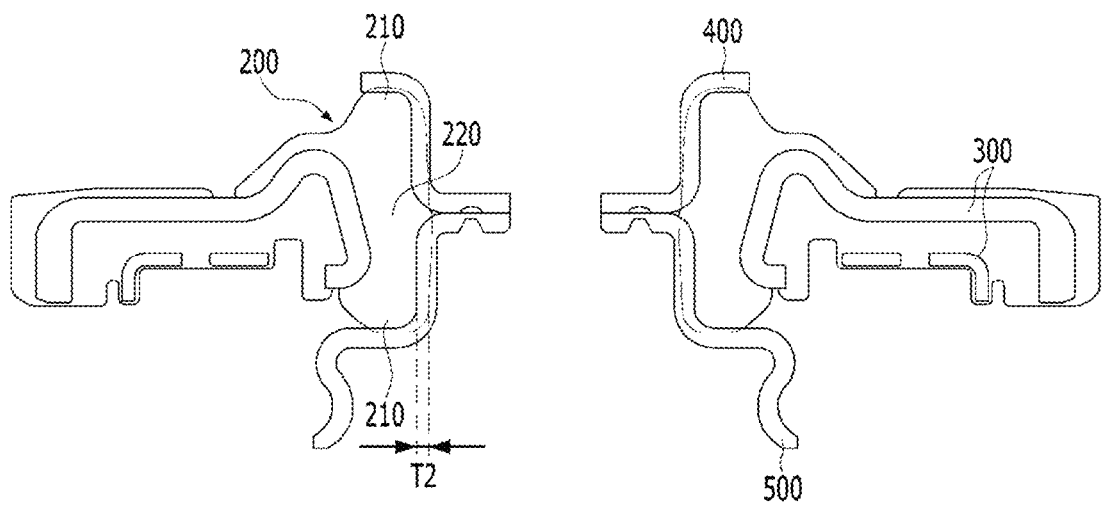
FIG. 5 is a cross-sectional view taken along direction M2 of FIG. 3.

As illustrated in FIGS. 3 and 5, the present disclosure provides a structure in which the second bush 200 has grooves 210 formed in the respective upper and lower portions thereof, and the upper and lower portions of the second bush 200 are in contact with the upper and lower cups 400 and 500 through the grooves 210, respectively, to thereby attenuate a large load transmitted through a coil spring.

The strut and the coil spring together with the strut insulator of the present disclosure form components of a front-wheel MacPherson strut suspension.

As illustrated in FIGS. 1 and 3, tapered boundaries 700 are formed in the first and second bushes 100 and 200 and are spaced apart from each other to prevent interference during deformation under an axial load.

As illustrated in FIG. 4, the first bush 100 has a central portion 110 formed to overlap the upper and lower cups 400 and 500, thereby preventing the first bush 100 from sliding relative to the upper and lower cups 400 and 500 when a load is applied thereto. In this way, it is possible to prevent noise transmission.

Reference numeral T1 in FIG. 4 denotes a thickness by which the central portion 110 of the first bush 100 overlaps the upper and lower cups 400 and 500. The above overlap means that the first bush 100 is pressed against the upper and lower cups 400 and 500 while the thickness of the central portion 110 of the first bush 100 is reduced when the upper and lower cups 400 and 500 are press-fitted into the first bush 100.

As illustrated in FIG. 5, the second bush 200 also has a central portion 220 formed to overlap the upper and lower cups 400 and 500, thereby preventing the second bush 200 from sliding relative to the upper and lower cups 400 and 500 when a load is applied thereto. In this way, it is possible to prevent noise transmission.

Reference numeral T2 in FIG. 5 denotes a thickness by which the central portion 220 of the second bush 200 overlaps the upper and lower cups 400 and 500.

As described above, the vehicle strut insulator according to the present disclosure includes the first and second bushes 100 and 200 having different hardness characteristics. In particular, the first bush 100 having a relatively high hardness is disposed in the left-right direction of the vehicle that affects the handling performance thereof, and the second bush 200 having a relatively low hardness is disposed in the forward-backward direction of the vehicle that affects the ride comfort thereof. Through this configuration, the vehicle strut insulator can satisfy both requirements for handling performance and for ride comfort and road noise performance.

In addition, the vehicle strut insulator of the present disclosure is configured such that the total area of the first bush 100, which has low dynamic characteristics and a relatively high hardness, is larger than that of the second bush 200 which has high-damping characteristics and a relatively low hardness. This imparts the strut insulator with greater overall strength and rigidity.

Moreover, the vehicle strut insulator of the present disclosure is configured such that the tapered boundaries 700 are formed in the first and second bushes 100 and 200 and are spaced apart from each other to prevent the first and second bushes 100 and 200 from interfering with each other during deformation under an axial load. As a result, it can help the performance of the insulator.

Furthermore, the vehicle strut insulator of the present disclosure is configured such that the central portion 110 of the first bush 100 and the central portion 220 of the second bush 200 are formed so as to overlap the upper and lower cups 400 and 500. Through this configuration, it is possible to prevent the first and second bushes 100 and 200 from sliding when a load is applied thereto and thus achieve prevention of noise transmission and improvement in durability.

As is apparent from the above description, the vehicle strut insulator of the present disclosure includes the first and second bushes having different hardness characteristics. The first bush having a relatively high hardness is disposed in the left-right direction of the vehicle that affects the handling performance thereof, and the second bush having a relatively low hardness is disposed in the forward-backward direction of the vehicle that affects the ride comfort thereof. Through this configuration, the vehicle strut insulator can satisfy both requirements for handling performance and for ride comfort and road noise performance.

In addition, the vehicle strut insulator of the present disclosure is configured such that the total area of the first bush, which has low dynamic characteristics and a relatively high hardness, is larger than that of the second bush which has high-damping characteristics and a relatively low hardness. This imparts the strut insulator with greater overall strength and rigidity.

Moreover, the vehicle strut insulator of the present disclosure is configured such that the tapered boundaries are formed in the first and second bushes and are spaced apart from each other to prevent the first and second bushes from vertically interfering with each other during deformation under an axial load. As a result, it can help the performance of the insulator.

Furthermore, the vehicle strut insulator of the present disclosure is configured such that the central portion of the first bush and the central portion of the second bush are formed so as to overlap the upper and lower cups. Through this configuration, it is possible to prevent the first and second bushes from sliding when a load is applied thereto and thus achieve prevention of noise transmission and improvement in durability.

Although specific embodiments of the present disclosure have been disclosed for illustrative purposes, those having ordinary skill in the art should appreciate that various modifications, additions and substitutions are possible, without departing from the scope and spirit of the present disclosure.

What is claimed is:

1. A vehicle strut insulator comprising:
   a first bush and a second bush having different hardnesses;
   an insert plate directly coupled to the first and second bushes; and
   an upper cup and a lower cup coupled to the first and second bushes through centers thereof,
   wherein:
   the second bush has grooves formed in respective upper and lower portions thereof; and
   upper and lower portions of the second bush are in contact with the upper and lower cups through the grooves, respectively, to attenuate a large load transmitted through a coil spring.

2. The vehicle strut insulator according to claim 1, wherein:
   the first bush is made of hard rubber having a hardness higher than a hardness of the second bush.

3. The vehicle strut insulator according to claim 2, wherein:
   the first bush is made of rubber with low dynamic characteristics for desirable vibration isolation; and
   the second bush is made of rubber with high damping force for desirable shock absorption.

4. The vehicle strut insulator according to claim 3, wherein the first bush has a total area greater than a total area of the second bush.

5. The vehicle strut insulator according to claim 2, wherein:
   the first bush is disposed in a left-right direction of a vehicle and configured to affect handling performance; and
   the second bush is disposed in a forward-backward direction of the vehicle and configured to affect ride comfort.

6. The vehicle strut insulator according to claim 2, wherein the first bush has upper and lower portions spaced apart from the respective upper and lower cups to attenuate a small load transmitted through a strut.

7. The vehicle strut insulator according to claim 2, wherein tapered boundaries are formed in the first and second bushes and are spaced apart from each other to prevent interference during deformation under an axial load.

8. The vehicle strut insulator according to claim 2, wherein the first bush has a central portion formed to overlap the upper and lower cups, thereby preventing the first bush from sliding relative to the upper and lower cups when a load is applied thereto.

9. The vehicle strut insulator according to claim 2, wherein the second bush has a central portion formed to overlap the upper and lower cups, thereby preventing the second bush from sliding relative to the upper and lower cups when a load is applied thereto.

* * * * *